C. A. PARSONS, S. S. COOK AND L. M. DOUGLAS.
PACKING FOR ROTATING SHAFTS.
APPLICATION FILED JUNE 19, 1918.
1,331,522.  Patented Feb. 24, 1920.
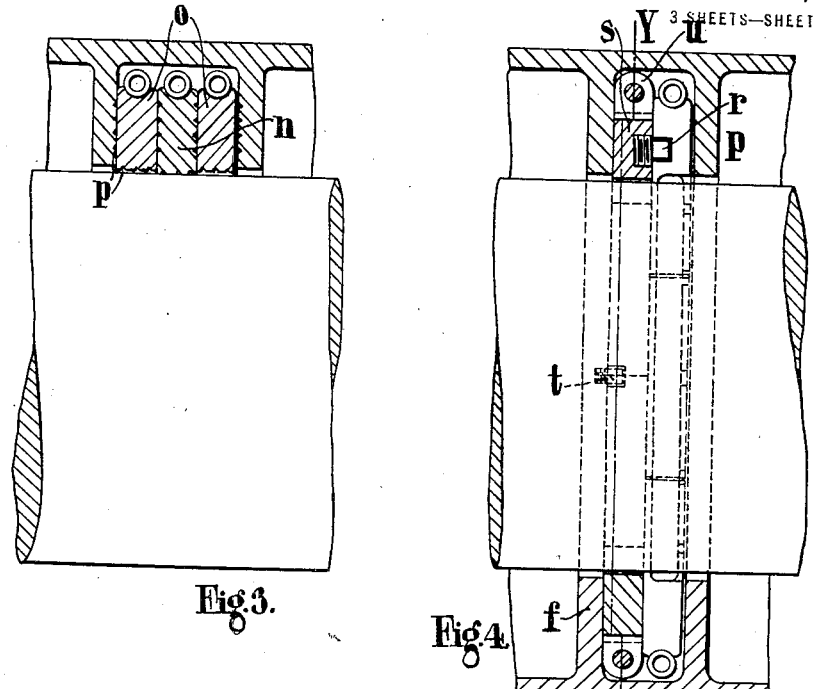
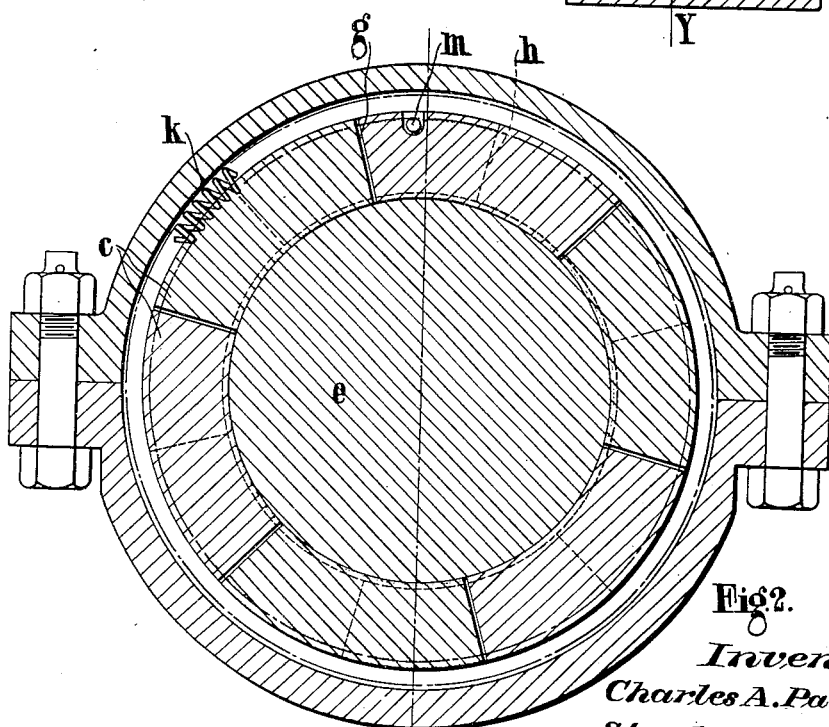
Inventors:
Charles A. Parsons,
Stanley S. Cook,
Louis M. Douglas,
by Spear, Middleton, Donaldson & Spear
Attys.

C. A. PARSONS, S. S. COOK AND L. M. DOUGLAS.
PACKING FOR ROTATING SHAFTS.
APPLICATION FILED JUNE 19, 1918.

1,331,522.

Patented Feb. 24, 1920.
3 SHEETS—SHEET 3.

Inventors.
Charles A. Parsons,
Stanley S. Cook,
Louis M. Douglas,
by Spear, Middleton, Donaldson & Spear
Attys.

UNITED STATES PATENT OFFICE.

CHARLES ALGERNON PARSONS, OF NEWCASTLE-UPON-TYNE, AND STANLEY SMITH COOK AND LOUIS MORTIMER DOUGLAS, OF WALLSEND, ENGLAND; SAID COOK AND SAID DOUGLAS ASSIGNORS TO SAID PARSONS.

PACKING FOR ROTATING SHAFTS.

1,331,522.        Specification of Letters Patent.        Patented Feb. 24, 1920.

Application filed June 19, 1918. Serial No. 240,886.

*To all whom it may concern:*

Be it known that we, CHARLES ALGERNON PARSONS, a subject of the King of Great Britain and Ireland, and residing at Heaton Works, Newcastle-upon-Tyne, in the county of Northumberland, England, and STANLEY SMITH COOK and LOUIS MORTIMER DOUGLAS, both subjects of the King of Great Britain and Ireland, and both residing at Turbinia Works, Wallsend-upon-Tyne, in the county of Northumberland, England, have invented certain new and useful Improvements in Packing for Rotating Shafts, of which the following is a specification.

The present invention relates to glands for packing rotating shafts and has for its object to construct such glands in an improved manner so that leakage along the shaft is minimized while undue wear by running of the shaft is avoided.

Heretofore carbon or like glands for packing rotating shafts have been employed consisting of a series of single rings of carbon contained in separate grooves, and in some cases two rings in a single groove have been employed. These rings are usually composed of several segments with either plain butt joints or scarfed joints held to the shaft by means of an encircling spiral spring, the joints being left slightly open to insure that the spring presses the carbons into contact with the shaft.

In such glands it is necessary to leave a fairly large clearance between the shaft and the inwardly projecting metallic flanges of the gland which form the partitions between the grooves, this clearance being necessary, as contact between the gland and the shaft when the latter is rotating at high speeds would have serious consequences.

In such construction it will be seen that the steam can escape through that part of the open joint between two segments of the carbon ring which is opposite to the radial clearance in the gland partition, this part of the joint not being covered by the partition walls.

It has also been proposed to pack reciprocating parts such as piston rods by metallic rings, two or more rings being placed in a single groove and so arranged that one ring fits close to the reciprocating rod and has open joints while another ring in the same groove is undivided and gives a clearance around the reciprocating rod.

The present invention consists in a gland having two or more carbon or like packing rings in each groove, one of the rings having the usual open joints, while another has closed joints held closely together by means of the spring.

The invention further consists in the improved carbon glands for packing rotating shafts hereinafter described.

Referring to the accompanying drawings:—

Fig. 2 is a section on the line X—X, Fig. 1.

Fig. 3 is a section showing a gland suitable for use where a steam flow may be required to be reversed.

Fig. 4 is a section showing another form of the invention where the steam flow is in only one direction, while

Figure 1:
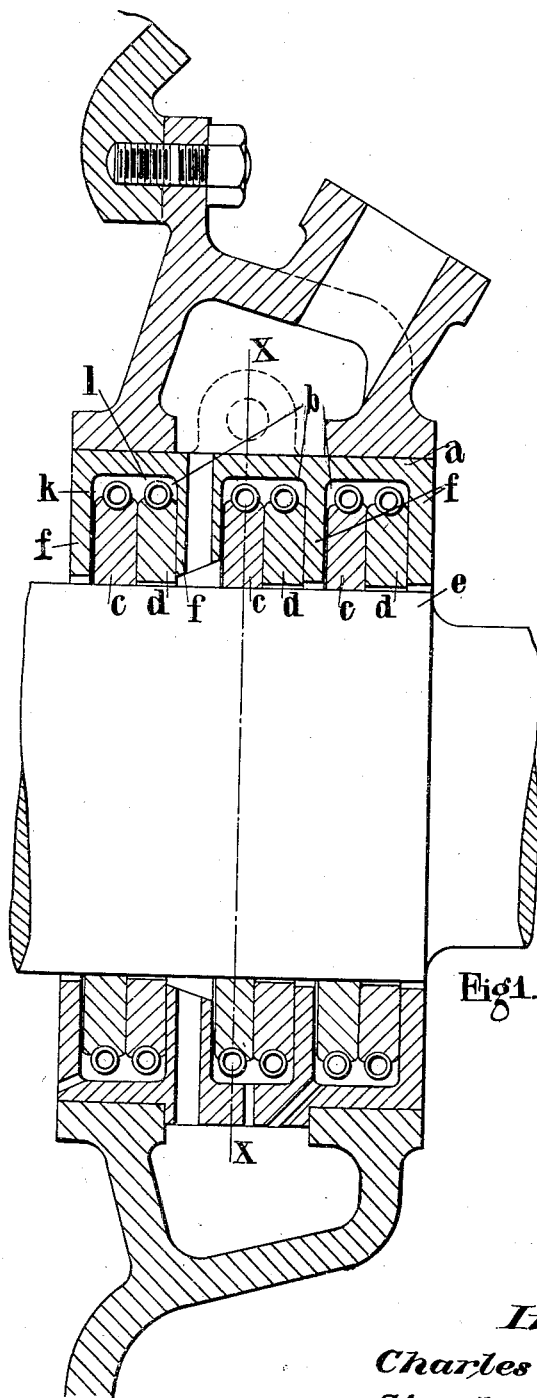
Figure 1 is a section of a carbon gland in accordance with the invention.

In the form of the invention illustrated in Figs. 1 and 2, the gland $a$ is provided with three grooves $b$, $b$, $b$, each groove being slightly wider than the width required for the carbon packing rings $c$, $d$. A fairly large clearance is left between the shaft $e$ and the inwardly projecting metallic flanges $f$, $f$, on the gland $a$. The carbon ring $c$ on the steam side in each groove has the usual open joints $g$ and is pressed on the shaft by the spring $k$, while the segments of the other carbon ring $d$ in each groove have closed joints $h$, the ends of the segments being held close against each other by means of the spring $l$ thereby forming a closed ring. There may be a clearance between the bore of the second rings $d$ and the shaft, but this clearance can be made exceedingly small, preferably just sufficient to insure that the joints between the segments are closed. The two rings $c$, $d$, are arranged so that their joints $g$, $h$ are not opposite each other so that the second rings almost completely cover the open joints of the rings on the steam side, so that leakage is reduced to a very small amount.

Stops are usually provided to prevent the carbon rings from rotating with the shafts, and in the case of the ring $c$ with the open joints this stop $m$ is preferably provided at the top of the gland. The effect of this is that with either direction of rotation of the shaft, on account of the friction between the carbon segments and the shaft, the accumulated opening of all the joints occurs at the top, adjacent to the stop. Should the closed joint ring be large in the bore due to wear or other cause, its weight will cause it to ride upon the shaft at the top, and the opening of the joints of the other ring being also on top, this opening will be most effectively blanked.

In some cases glands are employed in which it is desired to prevent fluid from escaping sometimes in one direction and sometimes in the opposite direction, and in such cases two oppositely arranged pairs of rings may be employed, each pair being situated in a separate groove, or, as shown at Fig. 3, three rings may be employed in one groove, the center ring $n$ being constructed with open joints and the other two $o$, $o$, with closed joints. The joints at the segments of the rings may be scarfed, dovetailed or made in any desired form, but preferably plain radial butts are employed.

In Fig. 3 there is also illustrated circumferential grooves $p$, $p$, on the jointing faces for the purpose of assisting in the prevention of leakage by utilizing the labyrinth principle.

Figure 5:
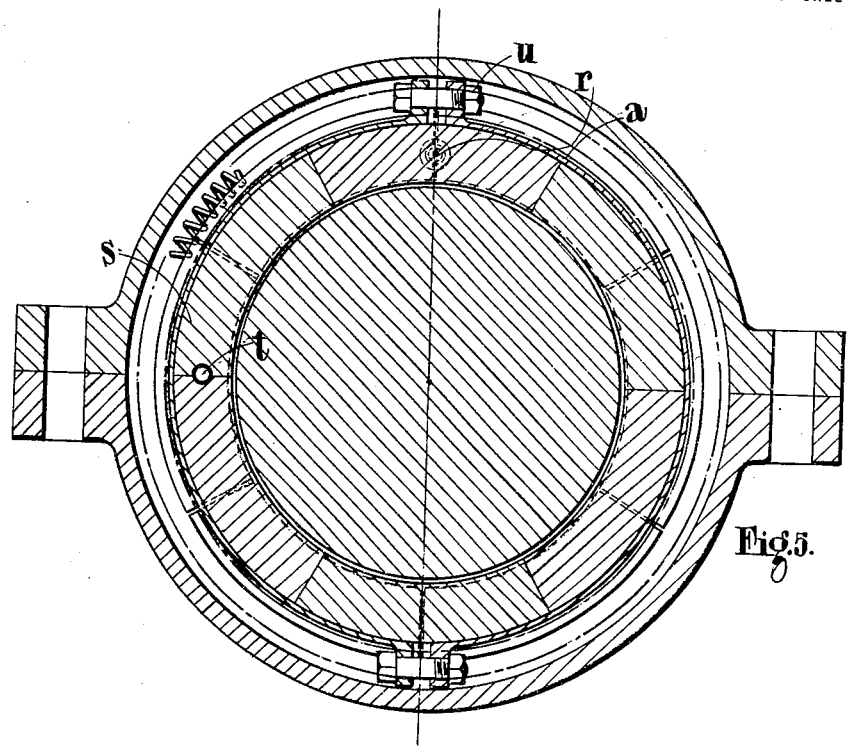
Fig. 5 is a section on the line Y—Y, Fig. 4.

In the form of the invention shown in Figs. 4 and 5, grooves are cut in ring $p$ on the steam side to relieve the inward radial steam pressure and thus reduce the total inward radial force on the carbons, thus diminishing total friction while retaining a robust form of ring. The open ring is prevented from rotation by the pin $r$ engaging with the closed ring $s$ which is held to the inwardly projecting flange $f$ on the gland by the pin $t$. In this case the open ring is held by a bolted ring $u$ instead of by a spring.

Figure 6:
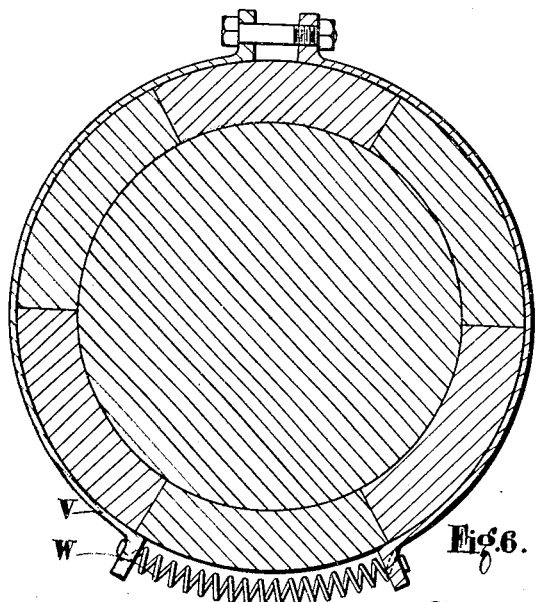
Fig. 6 is a section showing a modified method of holding the carbon segments.

Fig. 6 shows a further method of holding the rings comprising bolted straps $v$, $v$, combined with a spiral spring $w$.

In addition to reducing the leakage, packing glands constructed according to the invention have the further advantage that it is not necessary to work with very fine clearances to keep the leakage within reasonable limits. Further, a softer quality of carbon can be employed with larger openings of the joints of the rings on the steam side to allow for taking up the wear. The tendency of the carbon rings to wear grooves in the shaft is thus avoided.

In order to reduce the liability to leakage across the transverse faces of the carbon rings and partition walls, the partition wall on the high pressure side may have an increased bore so as to increase the area on which the high pressure steam acts. This pressure keeps the adjacent faces of the rings in close contact.

Having now described our invention, what we claim as new and desire to secure by Letters Patent is:—

1. In combination with a rotatable shaft, a packing gland having two or more packing rings of carbon or like material, the ring at the low pressure end being divided into two or more pieces without openings at the divisions, the adjacent ring being divided into two or more pieces each of which abuts the rotatable shaft but is circumferentially clear of the adjacent pieces of the same ring, thereby to be affected only individually by transverse vibrations of the rotary shaft, and means to hold the pieces of each ring in proper position, both of said rings having a clearance between their outer peripheries and the wall of the gland, substantially as described.

2. In combination with a rotary shaft, a packing gland, two or more packing rings of carbon or like material in said gland adjacent each other, each of said rings being formed of unconnected segments and both capable of floating in a direction transverse to their axis, the segments of one ring bearing on the shaft but spaced apart from each other, while the segments of the other ring abut each other but normally have a slight clearance between them and the shaft, and means for holding the segments of the rings in proper position, substantially as described.

3. In combination with a rotating shaft, a packing gland, two or more packing rings therein adjacent each other and having clearance between their outer peripheries and the wall of the gland, the ring at the low pressure end being formed in spaced apart segments and bearing on the shaft, and the other ring being formed in segments abutting each other, and having slight clearance between themselves and the shaft, and means for holding the rings in proper relation, substantially as described.

In testimony whereof we have signed our names to this specification.

CHARLES ALGERNON PARSONS.
STANLEY SMITH COOK.
LOUIS MORTIMER DOUGLAS.